(12) United States Patent
Okazaki (10) Patent No.: US 11,705,699 B2
(45) Date of Patent: Jul. 18, 2023

(54) SHEATH REMOVAL DEVICE AND SHEATH REMOVAL METHOD

(71) Applicant: YAZAKI CORPORATION, Tokyo (JP)

(72) Inventor: Kohsuke Okazaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 180 days.

(21) Appl. No.: 17/199,417

(22) Filed: Mar. 11, 2021

(65) Prior Publication Data

US 2021/0296866 A1 Sep. 23, 2021

(30) Foreign Application Priority Data

Mar. 19, 2020 (JP) .................................. 2020-049423

(51) Int. Cl.
*H02G 1/12* (2006.01)

(52) U.S. Cl.
CPC .................................. *H02G 1/1265* (2013.01)

(58) Field of Classification Search
CPC .. H02G 1/1265; H02G 1/1248; H02G 1/1253; H02G 1/1256; H02G 1/1273
USPC ......................... 81/9.4, 9.51, 9.41, 9.42, 9.43
See application file for complete search history.

(56) References Cited

U.S. PATENT DOCUMENTS

| 4,993,287 A | * | 2/1991 | Carpenter | ............ H02G 1/1265 81/9.51 |
| 5,243,882 A | * | 9/1993 | Stepan | .................. G02B 6/245 81/9.42 |
| 5,653,016 A | * | 8/1997 | Hoffa | .................. H02G 1/1256 81/9.51 |

FOREIGN PATENT DOCUMENTS

| JP | S51-95285 A | 8/1976 |
| JP | 2000-92644 A | 3/2000 |
| JP | 2013-118797 A | 6/2013 |
| JP | 2017-208926 A | 11/2017 |

* cited by examiner

*Primary Examiner* — Phong H Nguyen
(74) *Attorney, Agent, or Firm* — Kenealy Vaidya LLP (57) ABSTRACT

A sheath removal device includes: an electric wire gripping member which grips an electric wire having a wire and a sheath that covers the wire; cutting blades which form a cut in the sheath at a cutting position that is located on a tip side than a position where the electric wire is gripped by the electric wire gripping member; and a sheath gripping member which grips a sheath tip portion that is a portion, from the tip of the sheath to the cutting position, of the sheath. The sheath gripping member peels off the sheath tip portion from the wire by performing a rotation operation about an extension direction of the electric wire and a pulling-out operation on the sheath tip portion.

9 Claims, 10 Drawing Sheets

SHEATH REMOVAL DEVICE AND SHEATH REMOVAL METHOD

TECHNICAL FIELD

The present disclosure relates to a sheath removal device and a sheath removal method for an electric wire.

BACKGROUND ART

To remove a tip portion of a sheath of an end of an electric wire in which a wire (core wire) is covered with the sheath, a cut is formed in the sheath along its circumference with blades and the sheath tip portion being gripped by the blades is peeled off by moving it toward the tip side of the electric wire (refer to JP-A-2013-118797, for example).

However, where a sheath tip portion to be removed is long, there may occur a case that it cannot be peeled off with the blades. In the case of an electric wire in which twisted wires are directly covered with a sheath, there may occur an event that a cut-formed sheath cannot be removed because the twisted core wires resist the act of moving it toward the tip side. Furthermore, a load acts on the blades directly in peeling off a sheath tip portion, possibly resulting in formation of a nick in a blade.

SUMMARY OF INVENTION

According to an embodiment of the present invention, a sheath removal device and a sheath removal method remove a sheath tip portion in an end of an electric wire reliably without imposing a load on cutting blades.

A sheath removal device includes an electric wire gripping member which grips an electric wire having a wire and a sheath that covers the wire;

cutting blades which form a cut in the sheath at a cutting position that is located on a tip side than a position where the electric wire is gripped by the electric wire gripping member; and a sheath gripping member which grips a sheath tip portion that is a portion, from the tip of the sheath to the cutting position, of the sheath.

The sheath gripping member peels off the sheath tip portion from the wire by performing a rotation operation about an extension direction of the electric wire and a pulling-out operation on the sheath tip portion.

DETAILED DESCRIPTION OF EMBODIMENT

A specific embodiment of the present invention will be hereinafter described with reference to the drawings.

Figure 1:
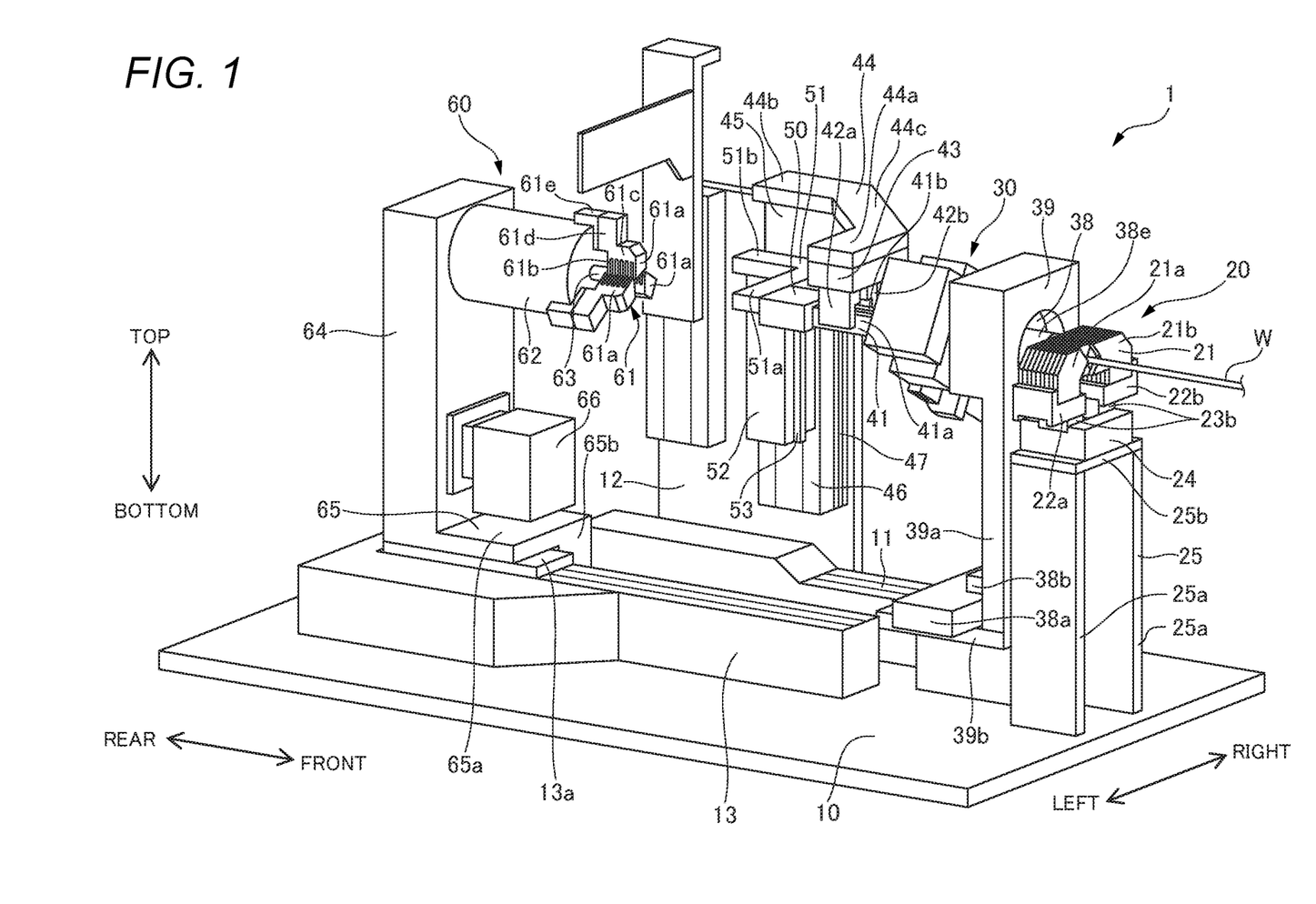
FIG. 1 is a perspective view of a sheath removal device according to an embodiment of the present invention.

FIG. 1 is a perspective view of a sheath removal device 1 according to the embodiment of the invention and shows an initial state (i.e., a state that a return to the origin positions has been made). The sheath removal device 1 according to the embodiment serves to expose part of a wire 101 of an electric wire W having the wire 101 (see FIG. 10) and a sheath 102 that covers the wire 101 by removing a tip portion of the sheath 102. In the embodiment, the wire 101 is two communication lines each of which is composed of a signal line and a cover formed on it and which extend parallel with each other (i.e., without being twisted together).

In the embodiment, the forward, rearward, leftward, rightward, upward, and downward directions mean directions toward the front side, rear side, left wide, right side, top side, and bottom side of the sheath removal device 1 unless otherwise specified. The front-rear direction of the sheath removal device 1 is parallel with the extension direction of the electric wire W.

As shown in FIG. 1, the sheath removal device 1 is mainly equipped with an electric wire insertion unit 20, a cutting unit 30, an electric wire guiding unit 40, a tip detection unit 50, and a sheath peeling unit 60. The sheath removal device 1 is further equipped with a control unit (not shown) which controls movement timings, operations, etc. of respective units.

The electric wire insertion unit 20 grips an electric wire W being inserted into the sheath removal device 1 rearward. The electric wire insertion unit 20 is disposed on a base 10 at a front position. The electric wire insertion unit 20 is equipped with an electric wire insertion unit chuck 21 (electric wire gripping member), a pair of holding members 22a and 22b, a pair of sliders 23a and 23b, a moving unit 24, and a support member 25.

The electric wire insertion unit chuck 21 is configured in such a manner that plural pairs of gripping arms 21a and 21b, each pair of gripping arms 21a and 21b opposed to each other with the electric wire W interposed in between, are arranged in the front-rear direction. Each pair of gripping arms 21a and 21b have V-shaped cuts at the tips. The plural pairs of gripping arms 21a and 21b are fixed to the pair of holding members 22a and 22b. The pair of holding members 22a and 22b are fixed to the pair of sliders 23a and 23b, respectively. The pair of sliders 23a and 23b are slid in the left-right direction so as to come closer to and go away from each other by the moving unit 24 such as an air cylinder. The moving unit 24 is fixed to the support member 25 which is erected from the base 10. The support member 25 consists of a pair of support plates 25a which are erected from the base 10 and a horizontal portion 25b which bridges the pair of support plates 25a, and thus assumes an approximately U shape when viewed in the front-rear direction. The moving unit 24 is fixed to the top surface of the horizontal portion 25b.

When the pair of sliders 23a and 23b have been moved so as to come closer to each other along rails that are provided on the top surface of the moving unit 24 so as to extend in the left-right direction, the gripping arms 21a and 21b are closed and the electric wire W is gripped by them between the V-shaped cuts. In a state that the gripping arms 21a and 21b are open, the electric wire W is held by the gripping arms 21a and 21b between the V-shaped cuts so as to be movable in the front-rear direction.

Figure 8:
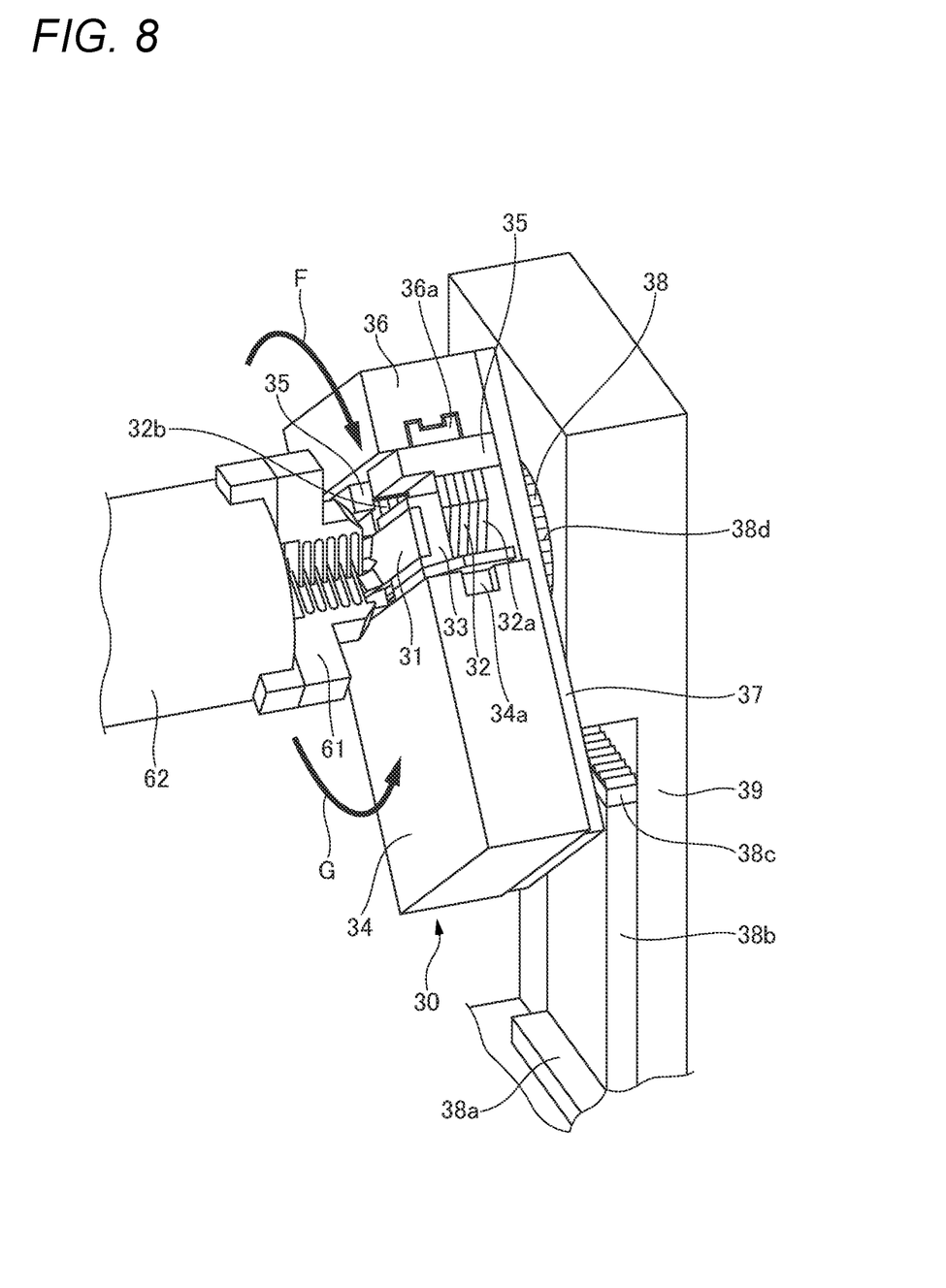
FIG. 8 is a partial enlarged view including the sheath peeling unit and the cutting unit and showing how the V-shaped blades are rotated clockwise and counterclockwise.

The cutting unit 30 forms a cut in the sheath 102 of the electric wire W. The cutting unit 30 is disposed in the rear of the electric wire insertion unit 20. As shown in FIG. 8, the cutting unit 30 is equipped with a pair of V-shaped blades 31, a cutting unit chuck 32, holding members 33 and 35, moving units 34 and 36, an attachment plate 37, a drive unit 38, and a support member 39.

Opposed to each other with the electric wire W located in between, the pair of V-shaped blades 31 form a cut having a prescribed depth in the sheath 102 at a prescribed position (cutting position) in the extension direction of the electric wire W. The pair of V-shaped blades 31 are fixed to the pair of holding members 33, respectively. The pair of holding members 33 are fixed to a pair of sliders 34a, respectively. The pair of sliders 34a are slid so as to come closer to and go away from each other parallel with a tangential direction of an outer circumference of the electric wire W by the moving unit 34 such as an air cylinder. The moving unit 34 is fixed to the attachment plate 37 disposed in front of it.

The cutting unit chuck 32 is disposed in front of the V-shaped blades 31 so as to be adjacent to them and grips the electric wire W at a position immediately in front of a cutting position. The cutting unit chuck 32 is configured in such a manner that plural pairs of gripping arms 32a and 32b, each pair of gripping arms 32a and 32b opposed to each other with the electric wire W located in between, are arranged in the front-rear direction. Each pair of gripping arms 32a and 32b have V-shaped cuts at their tips, respectively. Each pair of gripping arms 32a and 32b are fixed to a pair of holding members 35, respectively. The pair of holding members 35 are fixed to a pair of sliders 36a, respectively. The pair of sliders 36a are slid so as to come closer to and go away from each other parallel with a tangential direction of an outer circumference of the electric wire W by the moving unit 36 such as an air cylinder. The moving unit 36 is fixed to the attachment plate 37 disposed in front of it.

The attachment plate 37 is attached to the drive unit 38 and rotated clockwise and counterclockwise about the extension direction of the electric wire W (the axis of rotation).

The drive unit 38 includes a moving unit 38a, a sliding member 38b, a rack 38c, a pinion 38d, and a shaft 38e. The moving unit 38a such as an air cylinder moves the sliding member 38b disposed on its top surface in the left-right direction. The sliding member 38b is a plate member extending in the top-bottom direction. The bottom end of the sliding member 38b is attached to the moving unit 38a slidably, and the rack 38c which extends in the left-right direction is fixed to the top end of the sliding member 38b. The top surface of the rack 38c is formed with plural teeth. The pinion 38d is configured in such a manner that the outer circumferential surface of a circular plate is formed with plural teeth to be in mesh with the plural teeth of the rack 38c, and that a hollow shaft 38e which penetrates through the circular plate in the front-rear direction is fixed to the circular plate at the center. The shaft 38e is supported by the support member 39 so as to be rotatable about the extension direction of the electric wire W, and the electric wire W is inserted through the internal hole of the shaft 38e.

The support member 39 has a vertical portion 39a which extends in the top-bottom direction and a horizontal portion 39b which is attached to the bottom surface of the vertical portion 39a and extends in the front-rear direction. The support member 39 thus assumes an approximately L shape when viewed in the left-right direction. The vertical portion 39a has a through-hole in which the shaft 38e is disposed. The moving unit 38a is fixed to the top surface of the horizontal portion 39b.

When the rack 38c is moved horizontally in the left-right direction by the moving unit 38a, the pinion 38d is rotated about the extension direction of the electric wire W, as a result of which the attachment plate 37 is rotated via the shaft 38e. As a result, the pair of V-shaped blades 31 and the cutting unit chuck 32 which are attached to the attachment plate 37 are rotated about the extension direction of the electric wire W.

A moving unit 11 for sliding a slider (not shown) in the front-rear direction is attached to the base 10, and the horizontal portion 39b is fixed to the slider. Thus, the cutting unit 30 is moved in the front-rear direction by the moving unit 11.

The electric wire guiding unit 40 guides a tip of the electric wire W gripped by the electric wire insertion unit chuck 21 to a prescribed position. The electric wire guiding unit 40 is disposed in the rear of the cutting unit 30. The electric wire guiding unit 40 is equipped with an electric wire guiding pipe 41, a holding member 42 that includes holding portions 42a and 42b, a moving unit 43, a movement member 46, fixing members 44 and 45, and a rail member 47.

The electric wire guiding pipe 41 is a pipe that extends in the front-rear direction and through which the electric wire W can be inserted. The electric wire guiding pipe 41 is formed by combining divisional halves 41a and 41b (see FIG. 5) obtained by dividing a pipe along its longitudinal direction (front-rear direction). The divisional halves 41a and 41b are held by respective holding portions 42a and 42b. The holding portions 42a and 42b are attached to the moving unit 43 slidably via respective sliders. The divisional halves 41a and 41b are opened when the holding portions 42a and 42b are moved away from each other in the left-right direction by the moving unit 43. When the holding portions 42a and 42b are brought closer to each other in the left-right direction by the moving unit 43, the divisional halves 41a and 41b are closed to form the electric wire guiding pipe 41 and enable guidance of the electric wire W.

Since the tip of the electric wire W is guided to the prescribed position by the electric wire guiding pipe 41 and the electric wire W is gripped by the electric wire insertion unit chuck 21, a cut can be formed at a correct cut-forming position even in the case where a portion (sheath tip portion) to be removed of the sheath 102 is long.

The fixing member 44 is a plate member that assumes an approximately C shape when viewed in the top-bottom direction, and has attachment portions 44a and 44b and a connection portion 44c. The attachment portion 44a extends in the left-right direction and the moving unit 43 is attached to its bottom surface. The attachment portion 44b extends in the front-rear direction, and the top surface of the fixing member 45 is attached to its bottom surface. The connection portion 44c connects the attachment portions 44a and 44b.

The fixing member 45 is a plate member that extends in the top-bottom direction, and the movement member 46 is attached to its left surface. The movement member 46 is attached to a support plate 12 via a rail member 47. The support plate 12 is erected from the base 10 and extends in the front-rear direction. The rail member 47 is fixed to the left surface of the support plate 12. The rail member 47 and the movement member 46 extend in the top-bottom direction and the movement member 46 is moved in the top-bottom direction along the rail member 47. When the movement member 46 is moved in the top-bottom direction, the electric wire guiding pipe 41 which is connected to the movement member 46 via the fixing members 44 and 45, the moving unit 43, and the holding portions 42*a* and 42*b* is moved in the top-bottom direction.

The tip detection unit 50 detects that the tip of the electric wire W has reached the prescribed position. The tip detection unit 50 is disposed in the rear of the electric wire guiding unit 40 at such a position that the front end surface of the tip detection unit 50 is in contact with the rear end surface of the electric wire guiding pipe 41. The tip detection unit 50 detects, by a built-in proximity sensor, that the tip of the electric wire W inserted through the electric wire guiding pipe 41 has reached the prescribed position, and outputs a resulting detection signal to the control unit. The tip detection unit 50 is fixed to a fixing member 51.

The fixing member 51 has an attachment member 51*a* which extends in the left-right direction and an attachment member 51*b* which extends in the front-rear direction from a right end portion of the attachment member 51*a*. The fixing member 51 thus assumes an approximately L shape when viewed in the top-bottom direction. The rear end surface of the tip detection unit 50 is fixed to the front end surface of the attachment member 51*a*. A movement member 52 is attached to the bottom surface of the attachment member 51*b*. The movement member 52 is attached to the fixing member 45 via a rail member 53. The movement member 52 and the rail member 53 extend in the top-bottom direction on the left surface of the fixing member 45. The movement member 52 is moved in the top-bottom direction along the rail member 53. When the movement member 52 is moved in the top-bottom direction, the tip detection unit 50 which is attached to the movement member 52 via the fixing member 51 is moved in the top-bottom direction. The tip detection unit 50 can be elevated to the height of the fixing member 44 along the rail member 53. Since the tip detection unit 50 is attached to the fixing member 45 indirectly and the fixing member 45 is attached to the movement member 46, the tip detection unit 50 is also moved as the movement member 46 is moved along the rail member 47.

The sheath peeling unit 60 grips a sheath tip portion, from the tip to a cutting position, of the sheath 102. The sheath peeling unit 60 peels off the sheath tip portion from the wire 101 by performing a rotation operation about the extension direction of the electric wire W and a pulling-out operation on the sheath tip portion. The sheath peeling unit 60 is disposed on the base 10 at a rear position, that is, in the rear of the tip detection unit 50. The sheath peeling unit 60 is equipped with a sheath peeling chuck 61, a drive unit 62, a shaft 63, a support member 64, and a fixing member 65.

The sheath peeling chuck 61 includes three nails 61*a* which are arranged around the electric wire W at the same interval. Each nail 61*a* includes plural gripping arms 61*b* arranged in the front-rear direction, a holding portion 61*c* which holds the plural gripping arms 61*b*, a block 61*d* which projects from the rear end of the holding portion 61*c* in the radial direction of the electric wire W, and a moving portion 61*e* for moving the block 61*d* in the radial direction of the electric wire W. Each gripping arm 61*b* has an approximately V-shaped cut at the tip. When the three moving portions 61*e* move in the radial direction of the electric wire W so as to come closer to each other, the three arrays of gripping arms 61*b* are closed and thereby grip the sheath 102. When the three moving portions 61*e* are moved in the radial direction of the electric wire W so as to go away from each other, the three arrays of gripping arms 61*b* are opened and thereby disengage from the sheath 102.

The three moving portions 61*e* are disposed in front of the cylindrical drive unit 62 extending in the front-rear direction. The drive unit 62 is formed with, on the front side, three recesses which are arranged at the same interval and extend in the radial direction. The three moving portions 61*e* are set in the three respective recesses. The drive unit 62 moves the moving portions 61*e* in the radial direction by means of a built-in air cylinder. The shaft 63 is inserted in the drive unit 62 at its center so as to extend in the front-rear direction.

The drive unit 62 is attached to a top portion of the front surface of the rectangular support member 64 which extends in the top-bottom direction. The bottom surface of the support member 64 is fixed to the fixing member 65. The fixing member 65 includes a horizontal portion 65*a* which extends in the front-rear direction and a vertical block 65*b* which extends downward from a right-hand portion of the horizontal portion 65*a*. A slider 13*a* is fixed to the bottom surface of the horizontal portion 65*a*. The slider 13*a* is moved in the front-rear direction by a moving unit 13 such as a ROBO Cylinder or the like which is disposed on the base 10 so as to extend in the front-rear direction. The bottom surface of the vertical block 65*b* is fixed to a slide unit such as a linear guide (not shown). A drive unit 66 such as a ROBO Cylinder or the like is disposed over the horizontal portion 65*a* and attached to the front surface of the support member 64 at a low position.

Inside the support member 64, two timing pulleys are disposed at a high position and a low position and a timing belt is stretched between the timing pulleys. A rotary shaft of the lower timing pulley is connected to the drive shaft of the drive unit 66 and the rotary shaft is rotated in link with the drive shaft when the drive shaft is driven rotationally. When the lower timing pulley is rotated, the upper timing pulley is rotated via the timing belt. Since a rotary shaft of the upper timing pulley is connected to the shaft 63, the shaft 63 is rotated in link with this rotary shaft. When the shaft 63 is rotated, the sheath peeling chuck 61 is rotated about the extension direction of the electric wire W.

Figure 2:
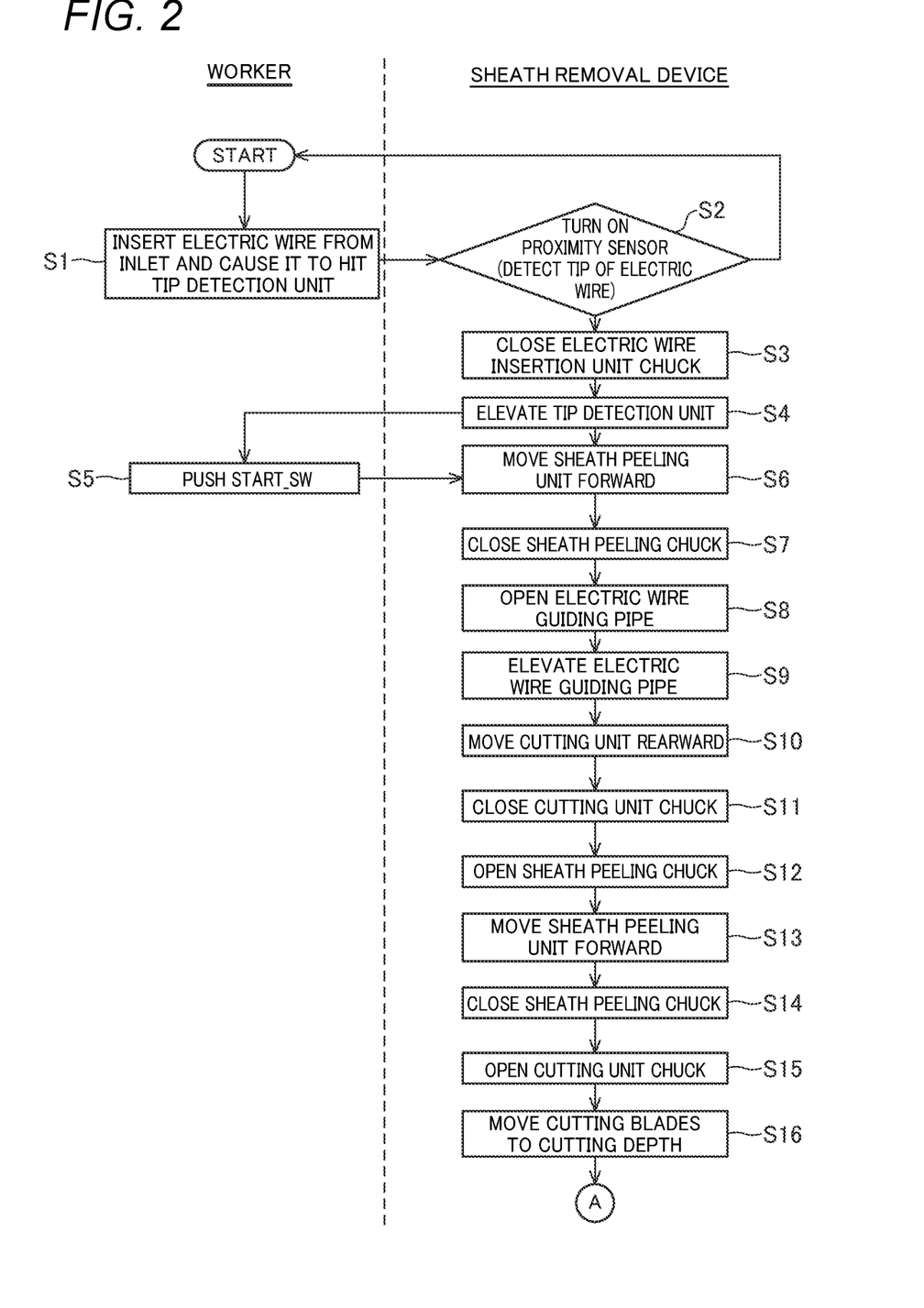
FIG. 2 is a part of a flowchart showing an example sheath removal method of the sheath removal device shown in FIG. 1.
Figure 3:
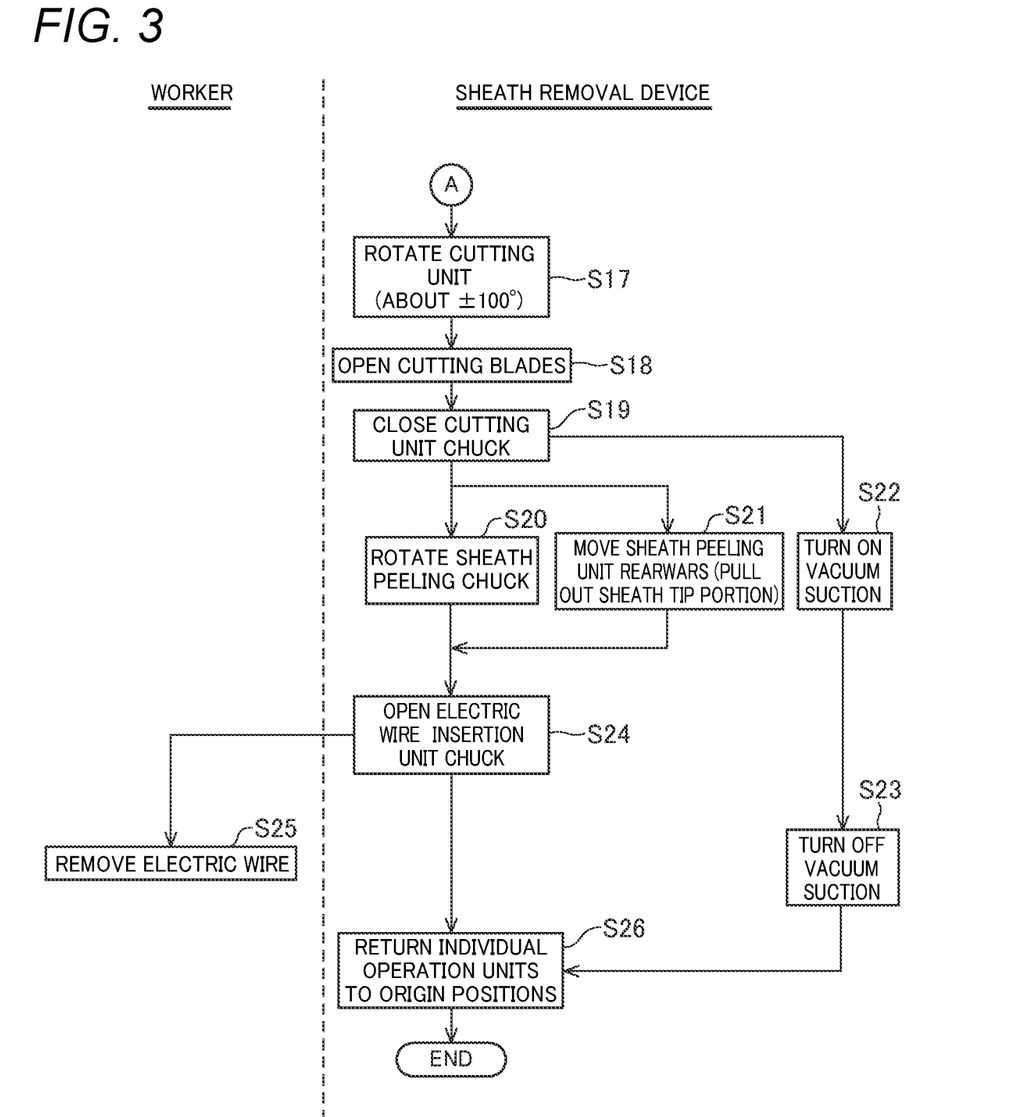
FIG. 3 is another part of the flowchart showing the example sheath removal method of the sheath removal device shown in FIG. 1.

How the sheath removal device 1 having the above configuration operates will be described with reference to FIGS. 2-10. FIGS. 2 and 3 are a flowchart showing an example sheath removal method of the sheath removal device 1. At the start of work, the individual operation units of the sheath removal device 1 are located at their respective origin positions. The individual operation units of the sheath removal device 1 operate according to manners of control, programmed in advance, of the control unit.

Figure 4:
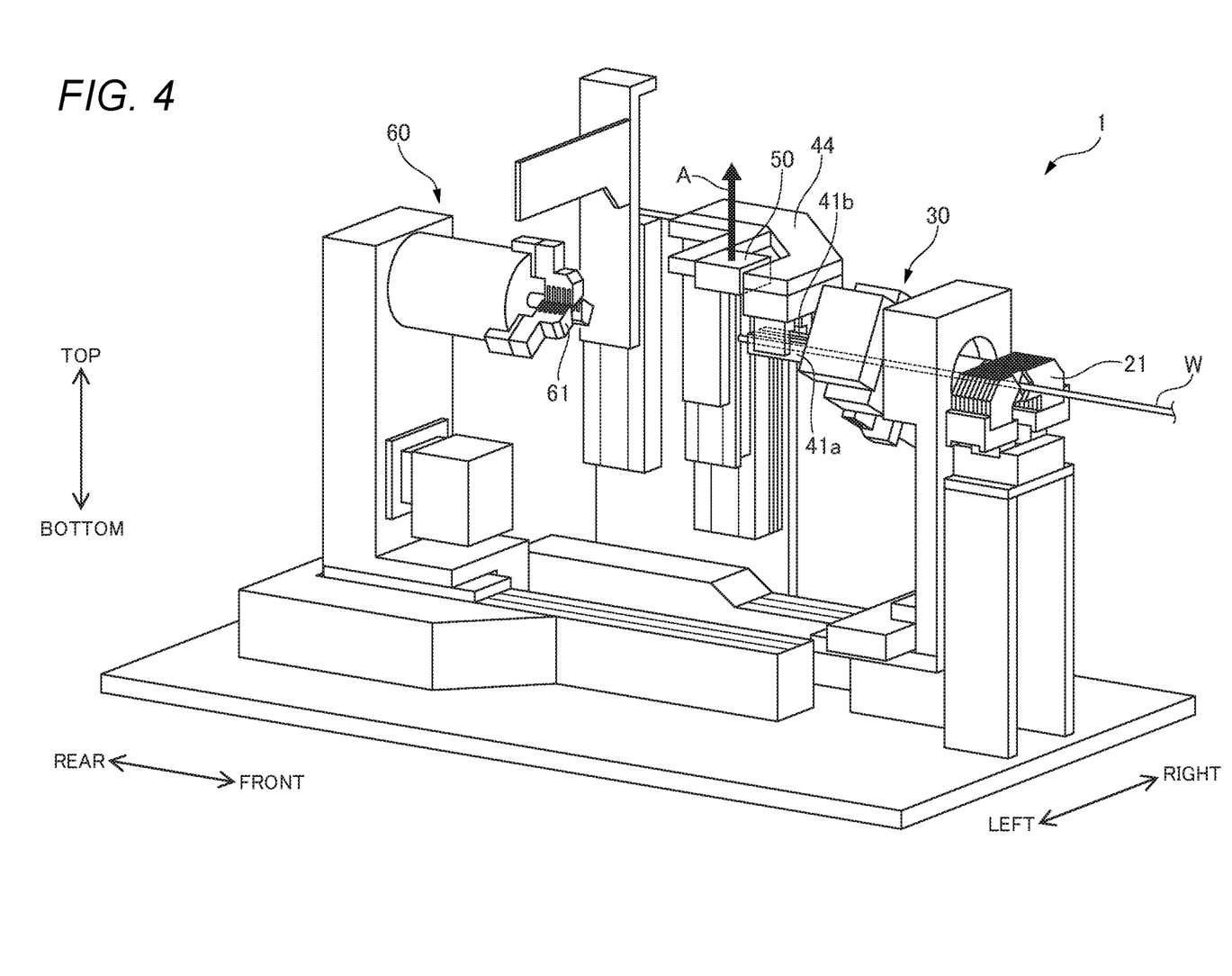
FIG. 4 shows a state that an electric wire has been set and a tip detection unit has been elevated.

At step S1, a worker inserts an electric wire W into the electric wire insertion unit chuck 21 that is in an open state from an electric wire inlet (not shown) and causes the tip of the electric wire W that has been guided into the electric wire guiding pipe 41 to hit the tip detection unit 50. When the proximity sensor of the tip detection unit 50 detects that the tip of the electric wire W has reached a prescribed position at step S2, the electric wire insertion unit chuck 21 is closed at step S3. At step S4, as shown in FIG. 4, the tip detection unit 50 is moved in the direction indicated by arrow A (elevated) to the height of the fixing member 44 (first escape position).

Figure 5:
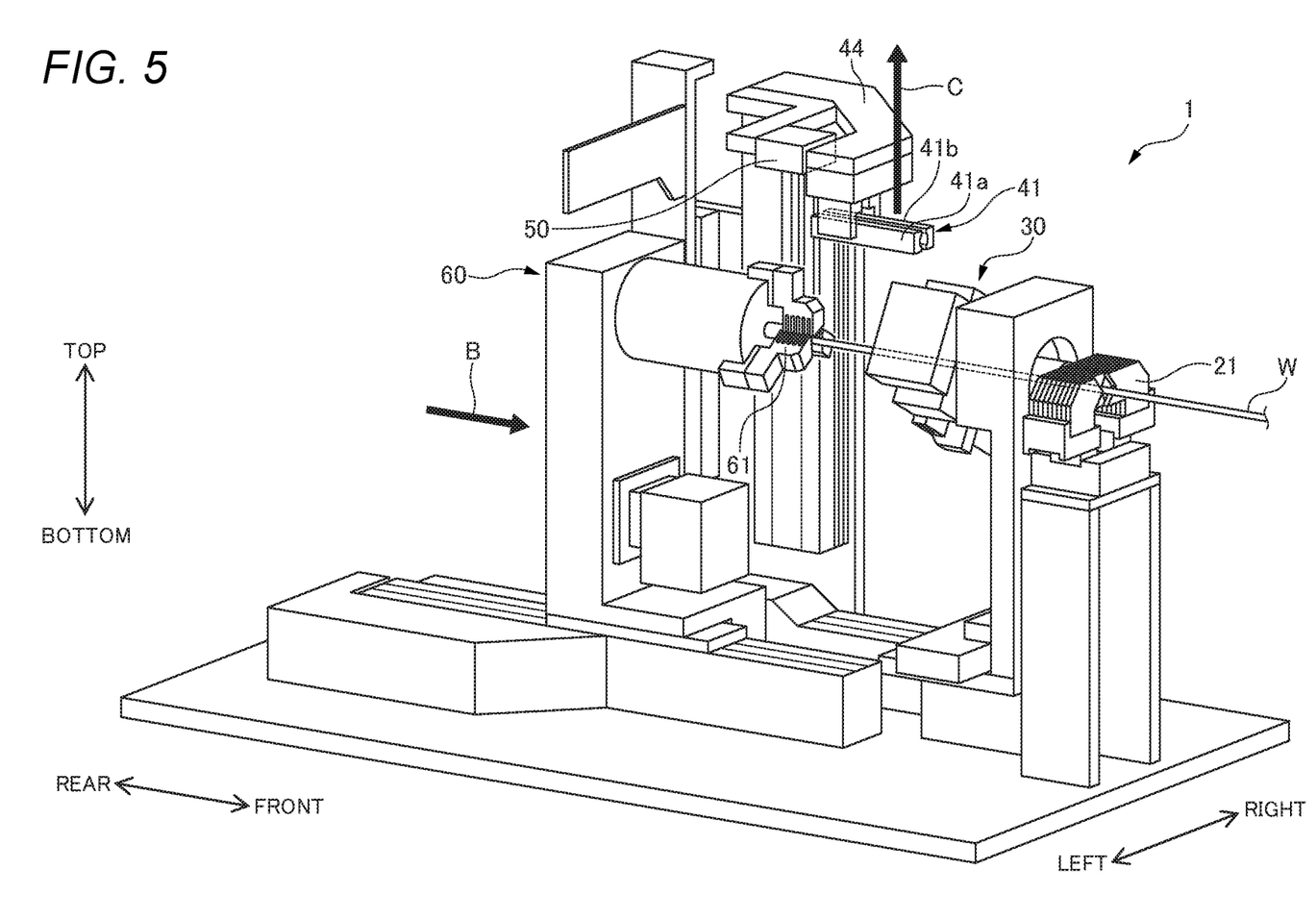
FIG. 5 shows a state that a tip of the electric wire has been gripped by a sheath peeling chuck and an electric wire guiding pipe has been elevated.

When in this state the worker pushes a start switch (START_SW; not shown) at step S5, as shown in FIG. 5 the sheath peeling unit 60 is moved forward (indicated by arrow B) at step S6. At step S7, the sheath peeling chuck 61 is closed to grip a tip portion of the sheath 102. Then the electric wire guiding pipe 41 (divisional halves 41a and 41b) is opened at step S8 and the opened electric wire guiding pipe 41 is moved in the direction indicated by arrow C (elevated) and escapes to a second escape position at step S9. As the electric wire guiding pipe 41 is elevated, the tip detection unit 50 is also elevated to the height of the second escape position.

Figure 6:
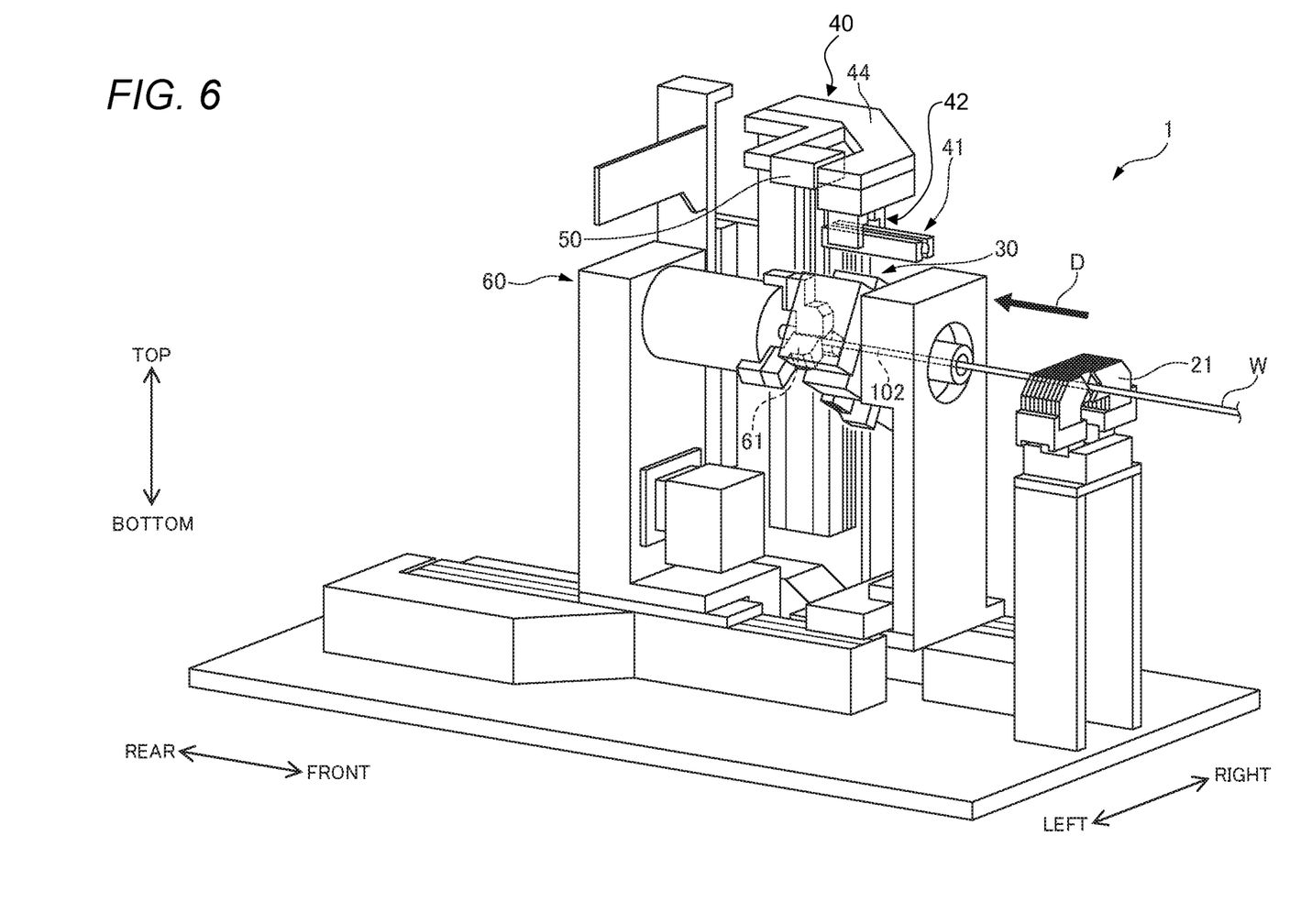
FIG. 6 shows a state that a cutting unit has been moved rearward.

At step S10, as shown in FIG. 6, the cutting unit 30 is moved rearward (i.e., in the direction indicated by arrow D). At step S11, the cutting unit chuck 32 (see FIG. 8) is closed. Then the sheath peeling chuck 61 is opened at step S12 and the sheath peeling unit 60 is advanced at step S13. At step S14, the sheath peeling chuck 61 is closed at a position where its front end is located immediately behind the cutting position, whereby the sheath peeling chuck 61 grips the sheath 102. Since the sheath peeling chuck 61 holds a portion, immediately behind the cutting position, of the sheath 102, a positional deviation of the electric wire W is suppressed when the sheath 102 is cut through rotation of the V-shaped blades 31, whereby a cut can be formed in the sheath 102 in a state that the electric wire W is kept straight. As a result, the quality of end processing for the electric wire W can be increased.

Figure 7:
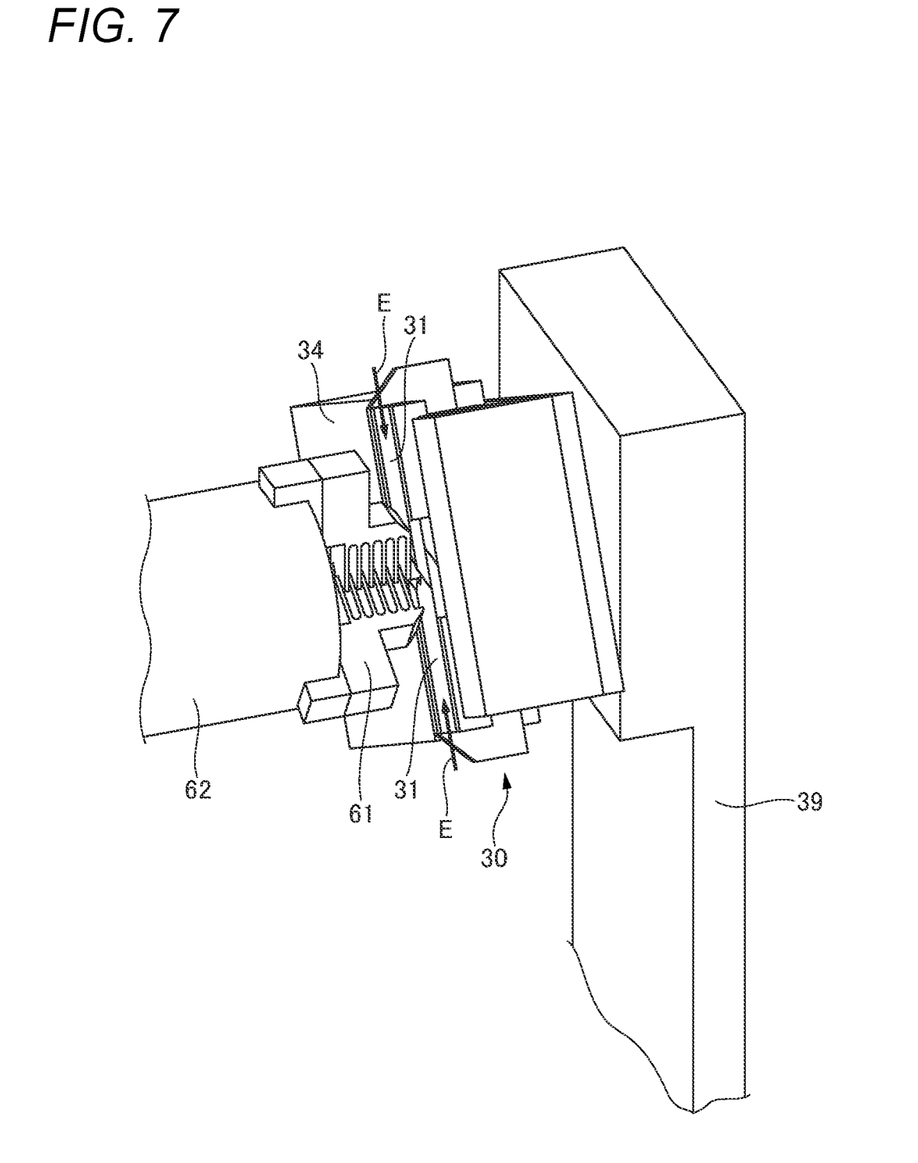
FIG. 7 is a partial enlarged view including a sheath peeling unit and a cutting unit and showing a state that a cutting unit chuck has gripped the electric wire immediately in front of a cutting position and V-shaped blades have been moved to a prescribed cutting depth.

At step S15, the cutting unit chuck 32 is opened. At step S16, as shown in FIG. 7, the cutting blades (V-shaped blades 31) are moved in directions indicated by arrows E to a prescribed cutting depth of the sheath 102, whereby a cut is formed in the sheath 102.

Figure 9:
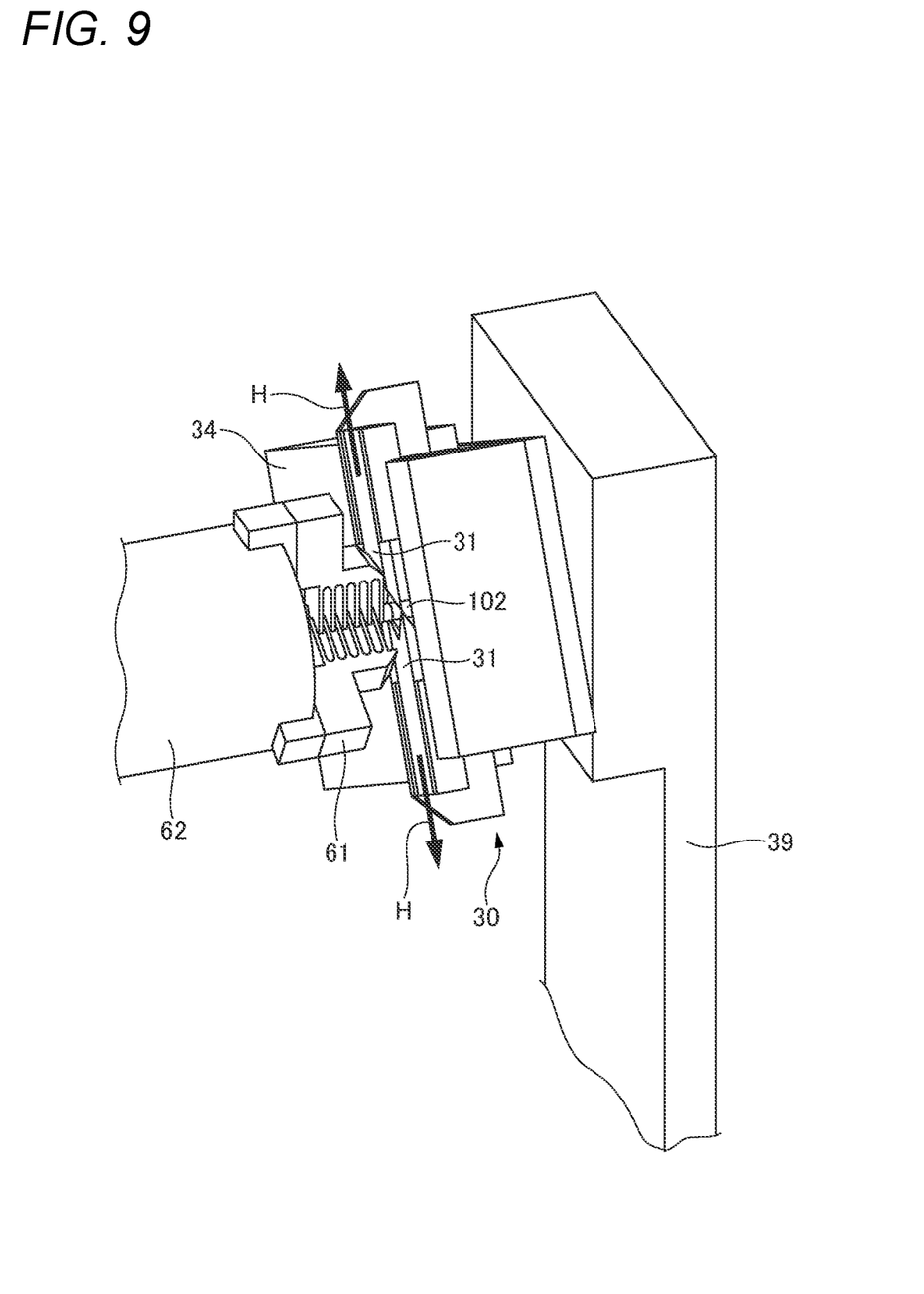
FIG. 9 is a partial enlarged view including the sheath peeling unit and the cutting unit and showing how the V-shaped blades are opened.

At step S17, as shown in FIG. 8, the cutting unit 30 is rotated about the extension direction of the electric wire W clockwise and counterclockwise (indicated by arrows F and G) by about 100° in a state that the V-shaped blades 31 of the cutting unit 30 is located at the prescribed cutting depth, whereby a cut is formed in the sheath 102 over its entire circumference. The manner of rotation of the V-shaped blades 31 is not limited to clockwise and counterclockwise rotations of about 100°. At step S18, as shown in FIG. 9, the cutting blades (V-shaped blades 31) are opened, that is, moved in directions indicated by arrows H. At step S19, the cutting unit chuck 32 is closed.

Figure 10:
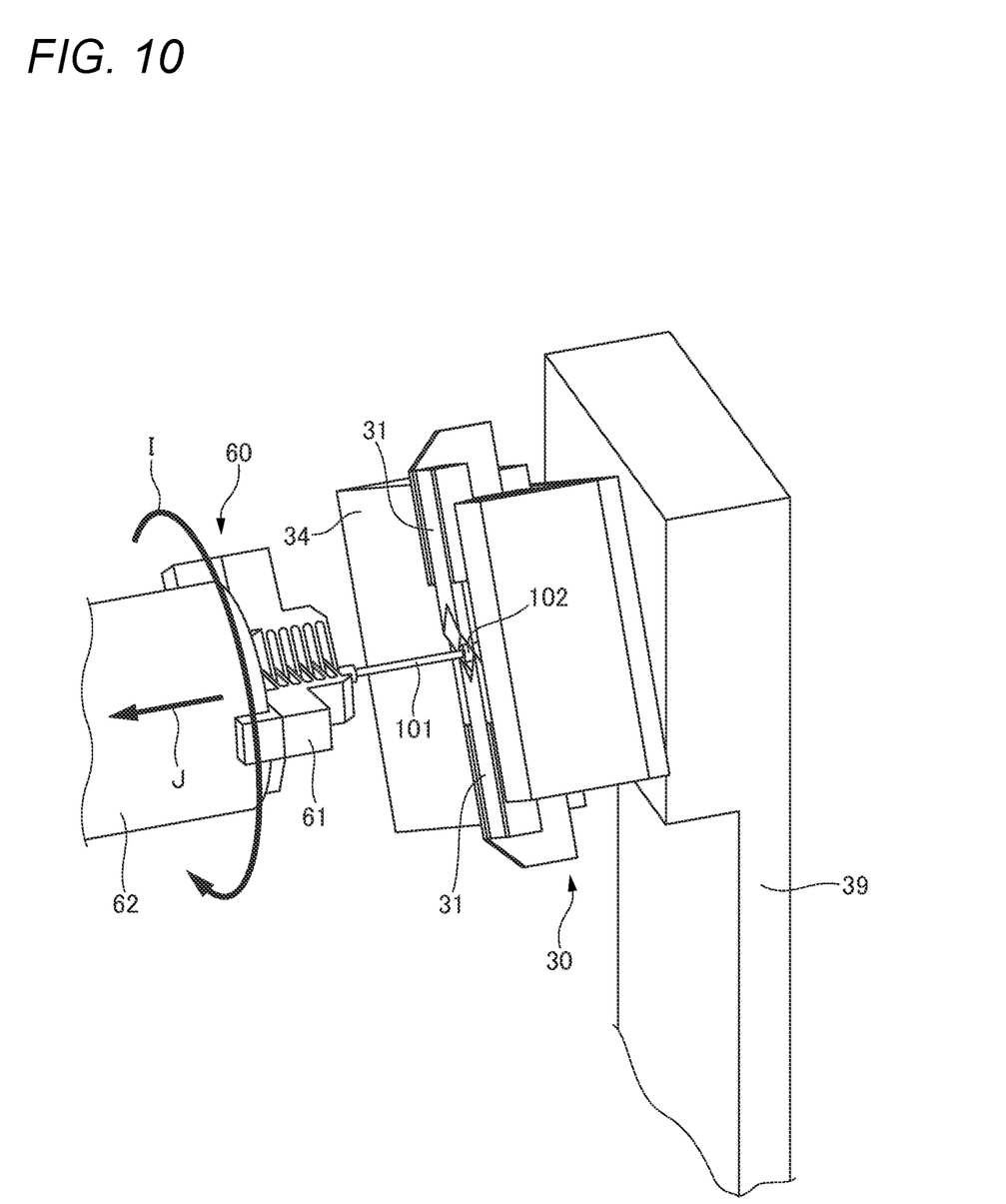
FIG. 10 is a partial enlarged view including the sheath peeling unit and the cutting unit and showing how the sheath peeling unit performs a rotation operation and a pulling-out operation while gripping a sheath tip portion.

At step S20, as shown in FIG. 10, the closed sheath peeling chuck 61 rotates the tip portion of the sheath 102 in a direction indicated by arrow I about the extension direction of the electric wire W. At step S21, the sheath peeling unit 60 is moved (retreats) in the direction indicated by arrow J at the same time as or after the above rotation operation, whereby the tip portion of the sheath 102 is pulled out.

On the other hand, at step S22, vacuum suction of a sheath absorbing unit (not shown) which is connected to the rear end surface of the support member 64 at the origin position is turned on. At step S23, the pulled-out tip portion of the sheath 102 is absorbed (collected) and then the vacuum suction is turned off. Since the tip portion, peeled off the wire 101, of the sheath 102 is absorbed (collected), electric wire refuse can be collected easily.

At step S24, the electric wire insertion unit chuck 21 is opened and the gripping of the electric wire W is canceled. At step S25, the worker removes, from the sheath removal device 1, the electric wire W from which the tip portion, having a prescribed length, of the sheath 102 has been pulled out. At step S26, the individual operation units return to their origin positions (see FIG. 1). The sheath removal method of the sheath removal device 1 is performed in the above-described manner.

As described above, according to the sheath removal device 1 of the embodiment, since the adhesion between the wire 101 and the sheath 102 can be canceled by a rotation operation, a tip portion of the sheath 102 can be removed easily by decreasing resistance (friction). In particular, a tip portion of the sheath 102 can be removed reliably even in the case where the tip portion is long (i.e., the peeling amount is large or the length of a portion to be exposed of a wire is great). Furthermore, no load is imposed on the V-shaped blades 31 because the V-shaped blades 31 (cutting blades) are not used in shifting a sheath tip portion.

Moreover, since the control unit controls movement timings, opening/closing operations, etc. of the operation units, a sheath tip portion can be removed reliably even in the case where the peeling amount is large.

The invention is not limited to the above-described embodiment and various modifications, improvements, etc. can be made as appropriate. The materials, shapes, sets of dimensions, values, forms, numbers, locations, etc. of the respective constituent elements of the above embodiment are not limited to those disclosed but can be determined in desired manners as long as the invention can be implemented. For example, although in the above embodiment the target of processing of the sheath removal device 1 is the electric wire W that is in such a form that the wire 101 is two wires that are not twisted together, the target of processing may be a twisted electric wire in which two communication lines are twisted together. The number of wires is not limited to two and may be four, for example. A shielded cable in which a braid, a metal foil, or the like exists between a wire and a sheath, a coaxial cable having a braid, or the like can be made a target of processing.

In the case of a twisted electric wire, the twist is loosened by rotating a sheath tip portion in the direction opposite to the twist direction of the twisted electric wire, whereby it becomes easier to pull out the sheath tip portion.

Where a braid, a metal foil, or a PET foil exists immediately inside a sheath, it is difficult to pull out a sheath tip portion after merely forming a cut in the sheath. On the other hand, a sheath tip portion can be removed reliably by pulling out the sheath tip portion while rotating it because the friction between the sheath and the member located immediately inside it is lowered. In particular, where a PET foil exists inside a sheath, the PET foil can be torn off by performing a rotation operation and a pulling-out operation on a sheath tip portion without forming a cut in the PET foil. In doing so, the force that is necessary to pull out a sheath tip portion can be reduced by lowering the friction by optimizing the rotation conditions (rotation direction and rotation angle) according to the members existing immediately inside the sheath (the twist pitch of twisted wires, the braiding pitch of a braid, etc.).

The number of nails 61a and the number of V-shaped blades 31 are not limited to three and two, respectively. Although in the embodiment the V-shaped blades 31 are employed as cutting blades, the shape of each blade is not limited to a V shape and may be another shape.

Features of the above-described sheath removal device and sheath removal method according to the embodiment of the invention will be summarized below concisely in the form of items [1] to [9]:

[1] A sheath removal device (1) comprising:
an electric wire gripping member (electric wire insertion unit chuck 21) which grips an electric wire (W) having a wire (101) and a sheath (102) that covers the wire;
cutting blades (V-shaped blades 31) which form a cut in the sheath at a cutting position that is located on a tip side than a position where the electric wire is gripped by the electric wire gripping member; and
a sheath gripping member (sheath peeling chuck 61) which grips a sheath tip portion that is a portion, from the tip of the sheath to the cutting position, of the sheath, wherein
the sheath gripping member peels off the sheath tip portion from the wire by performing a rotation operation about an extension direction of the electric wire and a pulling-out operation on the sheath tip portion.

[2] The sheath removal device according to item [1], wherein the sheath gripping member performs the pulling-out operation after the rotation operation.

[3] The sheath removal device according to item [1], wherein the sheath gripping member performs the pulling-out operation while performing the rotation operation.

[4] The sheath removal device according to any one of items [1] to [3], wherein
the wire is twisted wires in which at least two core wires are twisted together; and
the sheath gripping member rotates the sheath tip portion with at least one of a rotation direction and a rotation angle that are determined according to at least one of a twist direction and a twist pitch of the twisted wires that are in contact with an inner circumferential surface of the sheath.

[5] The sheath removal device according to any one of items [1] to [4], wherein
the electric wire has at least one of a braid and a foil;
the wire is twisted wires in which at least two core wires are twisted together; and
the sheath gripping member rotates the sheath tip portion with at least one of a rotation direction and a rotation angle that are determined according to which of the braid, the twisted wires, and the foil is in contact with an inner circumferential surface of the sheath.

[6] The sheath removal device according to any one of items [1] to [5], further comprising:
a tip detection unit (50) which detects that the tip of the electric wire has reached a prescribed position; and
an electric wire guiding unit (electric wire guiding pipe 41) which guides the tip of the electric wire gripped by the electric wire gripping member to the prescribed position, wherein
the sheath gripping member grips the sheath tip portion that includes the tip, guided to the prescribed position, of the electric wire.

[7] The sheath removal device according to any one of items [1] to [6], further comprising a sheath absorbing unit (step S22) which absorbs and collects the sheath tip portion that has been peeled off the wire by the sheath gripping member.

[8] The sheath removal device according to item [6], further comprising:
a cutting unit (30) which has, as the cutting blades, a pair of V-shaped blades (31) that are opposed to each other with the electric wire interposed in between, opens and closes the pair of V-shaped blades, and rotates the pair of V-shaped blades about the extension direction;
a sheath peeling unit (60) which has plural nails (61a) as the sheath gripping member, opens and closes the plural nails, and rotates the plural nails about the extension direction; and
a control unit which controls operations of the electric wire gripping member, the electric wire guiding unit, the tip detection unit, and the sheath peeling unit, wherein
when the tip of the electric wire that is held by the electric wire gripping member so as to be able to move in the extension direction has reached the prescribed position being guided by the electric wire guiding unit, under the control of the control unit
the tip detection unit detects the tip of the electric wire;
the electric wire gripping member closes to grip the electric wire;
the tip detection unit moves to a first escape position;
the sheath peeling unit moves so as to come closer to the electric wire gripping member and grips the sheath tip portion through closure of the plural nails;
the electric wire guiding unit moves to a second escape position;
the cutting unit moves so as to come closer to the sheath peeling unit so that the pair of V-shaped blades are located at the cutting position that is adjacent to the sheath tip portion, gripped by the sheath gripping member, of the sheath;
the cutting unit closes and rotates the pair of V-shaped blades; and
the sheath peeling unit performs the rotation operation in a state that the sheath tip portion is gripped by the plural nails and performs the pulling-out operation by moving away from the electric wire gripping member.

[9] A sheath removal method of the sheath removal device according to any one of items [1] to [8], comprising
gripping the electric wire by the electric wire gripping member (step S3);
forming the cut in the sheath at the cutting position by the cutting blades (steps S16 and S17); and
performing, by the sheath gripping member, the rotation operation (step S20) and the pulling-out operation (step S21) while gripping the sheath tip portion.

According to the sheath removal devices having the configurations of items [1], [2], and [3] and the sheath removal method having the steps of item [9], the adhesion between the wire and the sheath can be canceled by a rotation operation that is performed after formation of a cut by the cutting blades. Thus, a sheath tip portion (a sheath in an end of an electric wire) can be removed easily by decreasing resistance (friction). A sheath tip portion can be removed reliably even in the case where it is long (i.e., the peeling amount is large or the length of a portion to be exposed of a wire is great).

Where a braid, a metal foil, a PET (polyethylene terephthalate) foil, or the like exists immediately inside a sheath, there may occur a case that a sheath tip portion cannot be pulled out because of adhesion to the member existing immediately inside it. Even in such a case, a sheath tip portion can be removed reliably by pulling out the sheath tip portion while rotating it because the friction between the sheath and the member located immediately inside it is lowered. In particular, where a PET foil exists inside a sheath, the PET foil can be torn off by performing a rotation operation and a pulling-out operation on a sheath tip portion without forming a cut in the PET foil.

Furthermore, since the cutting blades are not used in shifting a sheath tip portion, no load is imposed on the cutting blades at that time. Thus, a sheath tip portion (the sheath in the end of the electric wire) can be removed reliably without imposing a load on the cutting blades.

Incidentally, in this disclosure, the term "wire (core wire)" means a communication line having a signal line and a cover formed on it.

According to the sheath removal device having the configuration of items [4] and [5] a sheath tip portion can be pulled out from twisted wires more easily because untwisting is made by, for example, rotating the sheath tip portion in the direction opposite to the twist direction. Furthermore, the force that is necessary to pull out a sheath tip portion can be reduced by optimizing the rotation conditions (rotation direction and rotation angle) according to the members existing immediately inside the sheath (a twist pitch of twisted wires, a braiding pitch of a braid, or the like.).

According to the sheath removal device having the configuration of item [6], since a tip portion of an electric wire is gripped after the tip is guided to a prescribed position, a cut can be formed at a correct position even in the case where a long sheath tip portion needs to be removed.

According to the sheath removal device having the configuration of item [7], refuse of an electric wire can be collected easily because a sheath tip portion that has been peeled off a wire is collected through absorption.

According to the sheath removal device having the configuration of item [8], since the control unit controls movement timings, opening/closing operations, etc. of the operation units, a sheath tip portion can be removed reliably even in the case where the peeling amount is large.

According to the embodiment, it is possible to remove the sheath tip portion in the end of the electric wire reliably without imposing a load on cutting blades.

What is claimed is:

1. A sheath removal device comprising:
   an electric wire gripping member which grips an electric wire having a wire and a sheath that covers the wire;
   a cutting unit including cutting blades which form a cut in the sheath at a cutting position that is located on a tip side than a position where the electric wire is gripped by the electric wire gripping member; and
   a sheath peeling unit including a sheath gripping member which grips a sheath tip portion that is a portion, from the tip of the sheath to the cutting position, of the sheath, wherein
   the sheath gripping member peels off the sheath tip portion from the wire by performing a rotation operation about an extension direction of the electric wire and a pulling-out operation on the sheath tip portion, and wherein
   the sheath peeling unit performs the rotation operation in a state that the sheath tip portion is gripped by the sheath gripping member and performs the pulling-out operation by moving away from the electric wire gripping member, when the cutting blades complete the cutting in the sheath and is in an open state of away from the sheath, so that the cutting blades are not used in shifting the sheath tip portion.

2. The sheath removal device according to claim 1, wherein the sheath gripping member performs the pulling-out operation after the rotation operation.

3. The sheath removal device according to claim 1, wherein the sheath gripping member performs the pulling-out operation while performing the rotation operation.

4. The sheath removal device according to claim 1, wherein
   the wire is twisted wires in which at least two core wires are twisted together; and
   the sheath gripping member rotates the sheath tip portion with at least one of a rotation direction and a rotation angle that are determined according to at least one of a twist direction and a twist pitch of the twisted wires that are in contact with an inner circumferential surface of the sheath.

5. The sheath removal device according to claim 1, further comprising:
   a control unit configured to cause the sheath gripping member to rotate the sheath tip portion with at least one of a rotation direction and a rotation angle that are determined according to which one of a braid, twisted wires, and a foil is in contact with an inner circumferential surface of the sheath.

6. The sheath removal device according to claim 1, further comprising:
   a tip detection unit which detects that the tip of the electric wire has reached a prescribed position; and
   an electric wire guiding unit which guides the tip of the electric wire gripped by the electric wire gripping member to the prescribed position, wherein
   the sheath gripping member grips the sheath tip portion that includes the tip, guided to the prescribed position, of the electric wire.

7. The sheath removal device according to claim 6, wherein
   the cutting blades of the cutting unit are formed with a pair of V-shaped blades that are opposed to each other with the electric wire interposed in between, opens and closes the pair of V-shaped blades, and rotates the pair of V-shaped blades about the extension direction;
   the sheath gripping member of the sheath peeling unit are formed with plural nails, the sheath peeling unit opens and closes the plural nails, and rotates the plural nails about the extension direction; and
   a control unit which controls operations of the electric wire gripping member, the electric wire guiding unit, the tip detection unit, and the sheath peeling unit, wherein
   when the tip of the electric wire that is held by the electric wire gripping member so as to be able to move in the extension direction has reached the prescribed position being guided by the electric wire guiding unit, under the control of the control unit
   the tip detection unit detects the tip of the electric wire;
   the electric wire gripping member closes to grip the electric wire;
   the tip detection unit moves to a first escape position;
   the sheath peeling unit moves so as to come closer to the electric wire gripping member and grips the sheath tip portion through closure of the plural nails;
   the electric wire guiding unit moves to a second escape position;
   the cutting unit moves so as to come closer to the sheath peeling unit so that the pair of V-shaped blades are located at the cutting position that is adjacent to the sheath tip portion, gripped by the sheath gripping member, of the sheath;
   the cutting unit closes and rotates the pair of V-shaped blades; and
   the sheath peeling unit performs the rotation operation in a state that the sheath tip portion is gripped by the plural nails and performs the pulling-out operation by moving away from the electric wire gripping member.

8. The sheath removal device according to claim 1, further comprising a sheath absorbing unit which absorbs and collects the sheath tip portion that has been peeled off the wire by the sheath gripping member.

9. A sheath removal method, comprising:
providing the sheath removal device according to claim 1;
gripping the electric wire by the electric wire gripping member;
forming the cut in the sheath at the cutting position by the cutting blades; and
performing, by the sheath gripping member, the rotation operation and the pulling-out operation while gripping the sheath tip portion.

* * * * *